United States Patent
Nam (12)

(10) Patent No.: US 6,326,997 B1
(45) Date of Patent: Dec. 4, 2001

(54) DIGITAL STILL CAMERA UTILIZING A PROGRESSIVE IMAGE SENSOR

(75) Inventor: Byung-Deok Nam, Suwon-si (KR)

(73) Assignee: Samsung Aerospace Industries, Ltd., Changwon-si (KR)

(*) Notice: Subject to any disclaimer, the term of this patent is extended or adjusted under 35 U.S.C. 154(b) by 0 days.

(21) Appl. No.: 08/996,994

(22) Filed: Dec. 23, 1997

(30) Foreign Application Priority Data

Dec. 30, 1996 (KR) .................................................. 96-78438

(51) Int. Cl.⁷ .............................. H04N 5/76; H04N 3/14; H04N 1/46
(52) U.S. Cl. ........................... 348/231; 348/294; 358/526
(58) Field of Search ..................................... 348/294, 311, 348/322, 324, 234, 232, 233, 552, 65, 222; 358/524, 426

(56) References Cited

U.S. PATENT DOCUMENTS

| 4,658,287 | * | 4/1987 | Chen ..................................... 348/305 |
| 5,164,831 | | 11/1992 | Kuchta et al. ........................ 358/209 |

FOREIGN PATENT DOCUMENTS

| 4100400A1 | 7/1992 | (DE) . |
| 8-335688 | 12/1966 | (JP) . |
| 8-9269 | 1/1996 | (JP) . |
| 8-125957 | 5/1996 | (JP) . |

* cited by examiner

Primary Examiner—Wendy R. Garber
Assistant Examiner—Rashaun N. Tillery
(74) Attorney, Agent, or Firm—Howrey Simon Arnold & White, LLP

(57) ABSTRACT

A digital still camera using a progressive image sensor includes an image sensor for capturing images and for generating image signals corresponding to the images, an image processor for generating image data corresponding to the image signals from the image sensor, and a memory for storing the image data from the image processor line by line. The invention further includes an image compression/decompression unit for compressing the image data and for decompressing the compressed image data, and a controller for controlling the image sensor, the image processor, and the image compression/decompression unit. Since the digital still camera uses a progressive image sensor which simultaneously generates analog image signals corresponding to an entire image, frame memories are not necessary for storing images.

16 Claims, 3 Drawing Sheets

DIGITAL STILL CAMERA UTILIZING A PROGRESSIVE IMAGE SENSOR

BACKGROUND OF THE INVENTION (a) Field of the Invention

The present invention relates to a digital still camera, and more particularly, to a digital still camera that uses a progressive image sensor.

(b) Description of the Related Art

FIG. 1 is a block diagram of a conventional digital still camera. As shown in FIG. 1, a lens unit 1 forms an image and directs it toward an image sensor/driving unit 3. The image sensor/driving unit 3 converts the light signals into corresponding electric signals.

The electric signals are applied to an analog/digital converter 5 and converted to digital image signals, which, in turn, are converted to digital color image data by an image sensor signal/color signal processing unit 7.

A lens driving/controlling unit 9 controls zooming, focusing, and the iris of lens unit 1. A control unit 11 controls operation of the entire system.

The digital color image data from the image sensor signal/color signal processing unit 7 is stored in a frame memory/strip memory 13. The frame memory/strip memory 13 includes a frame memory for storing one or more images and a strip memory for storing each line of the frame image. The data stored in the frame memory/strip memory 13 is applied to still image compression/decompression unit 15. The still image compression/decompression unit 15 compresses each still image stored in the frame memory/strip memory 13 and sends the compressed data to an image recording memory unit 17. The image recording memory unit 17 stores the compressed data.

The compressed data stored in the image recording memory unit 17 is decompressed by the still image compression/decompression unit 15, as needed. The decompressed data is applied to the image sensor signal/color signal processing unit 7 through the frame memory/strip memory 13. The image sensor signal/color signal processing unit 7 converts the decompressed data to digital image data, which are applied to a digital/analog converter 19 and converted to analog image signals. An image filter 21 generates analog color image signals from the analog image signals.

The compressed data stored in the image recording memory unit 17 is also transmitted to a computer through a computer interface unit 23.

As described above, the conventional digital still camera of prior art has to store a frame of digital image data in the frame memory 13 for data compression because the image sensor of the conventional digital still camera generates the image field-by-field in an interlace mode. The image data either needs to be stored in the frame memory unit 13 for compression, or the data must be compressed at the interlace speed.

A conventional digital still camera of the prior art uses the frame memory as a time delay because it employs an image sensor that is designed to output sequential images continuously. However, the increased number of pixels requires a large frame memory, which increases the cost of the camera.

SUMMARY OF THE INVENTION

It is an object of the present invention to provide a digital still camera employing a progressive image sensor that generates analog image signals corresponding to an entire image while simultaneously storing a frame of the image, without employing a frame memory.

Additional objects and advantages of the invention will be set forth in the description which follows, and/or will be obvious from the description, or may be learned by practice of the invention. The objects and advantages of the invention will be realized by means of the elements and combinations particularly pointed out in the appended claims.

To achieve the objects and in accordance with the purpose of the invention, as embodied and broadly described herein, the invention includes a progressive image sensor for capturing images and for generating image signals corresponding to the images, an image processor for generating image data corresponding to the image signals from the image sensor, and a strip memory for storing the image data from the image processor line-by-line. The invention further includes an image memory for storing the image data from the strip memory by means of the image processor.

Also, to achieve this object, the invention includes a progressive image sensor for capturing images and for generating image signals corresponding to the images, an image processor for generating image data corresponding to the image signals from the image sensor, and a memory for storing the image data from the image processor line-by-line. The invention further includes an image compression/decompression means for compressing the image data stored in the memory, for decompressing compressed image data, and for storing the decompressed image data in the memory. The invention also includes a camera controller for controlling the image sensor, the image processor, and the image compression/decompression means.

BRIEF DESCRIPTION OF THE DRAWINGS

The accompanying drawings, which are incorporated in and constitute a part of this specification, illustrate one embodiment of the invention and, together with the description, explain the principles of the invention. In the drawings.

DETAILED DESCRIPTION OF THE PREFERRED EMBODIMENTS

Reference will now be made in detail to the present preferred embodiment of the invention, an example of which is illustrated in the accompanying drawings.

Figure 1:
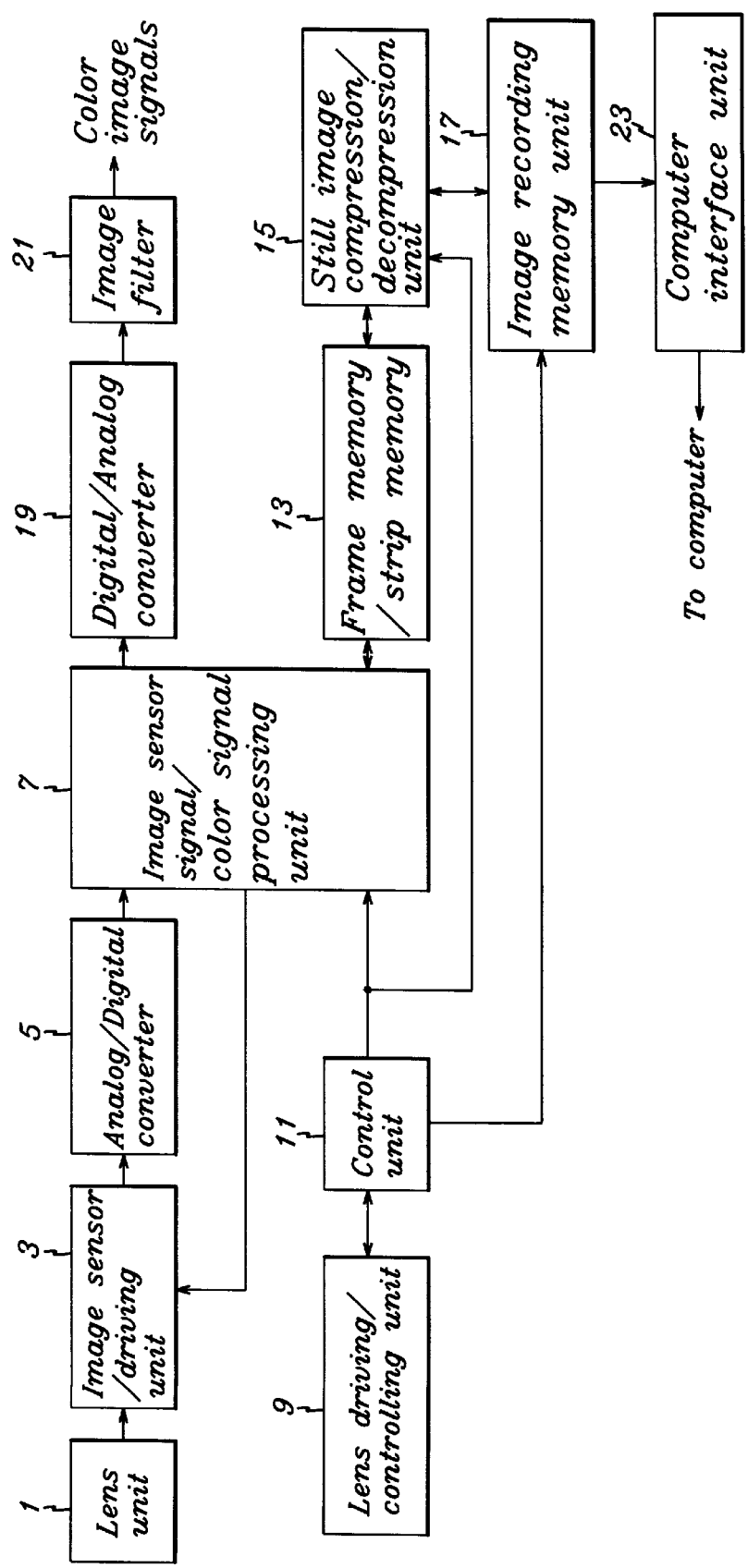
FIG. 1 is a block diagram of a conventional digital still camera.
Figure 2:
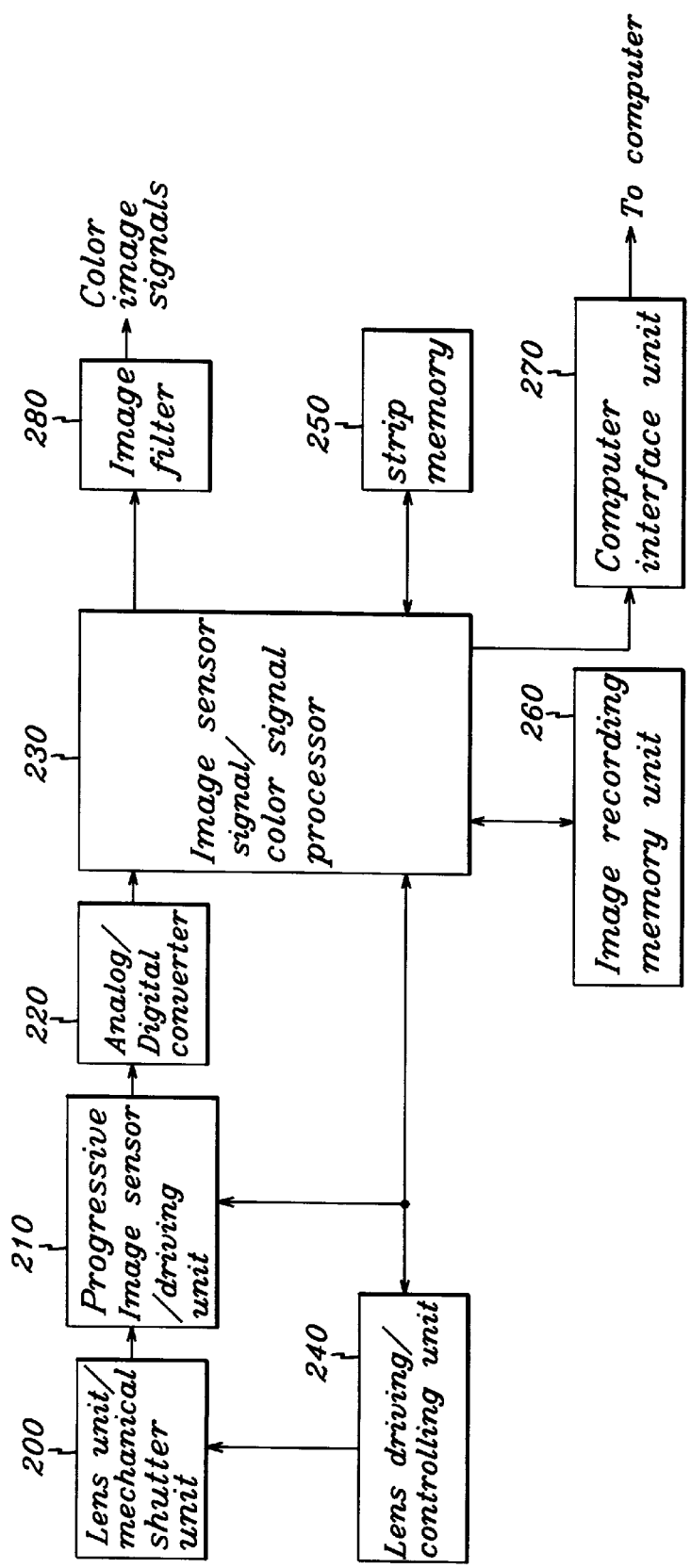
FIG. 2 is a block diagram of a digital still camera using a progressive image sensor in accordance with the first embodiment of the present invention.

FIG. 2 is a block diagram of a digital still camera using a progressive image sensor in accordance with the first embodiment of the present invention As shown in FIG. 2, the digital still camera comprises a lens unit/mechanical shutter unit 200 to form an image, a progressive image sensor/driving unit 210 to capture the image formed by the lens unit/mechanical shutter unit 200 and convert the light signals of the entire image into electric signals, an analog/digital converter 220 for converting the analog image signals from the progressive image sensor/driving unit 210 to digital image signals, a lens driving/controlling unit 240 to control the lens unit/mechanical shutter unit 200, and a strip memory 250 to store the digital color image data line by line. The camera further comprises a image signal processing/control unit 230 for generating digital color image data from the digital image signals, and for controlling the lens driving/controlling unit 240 and the progressive image sensor/driving unit 210. The camera also comprises an image recording memory 260 for storing the digital color image data from the strip memory by means of the image signal processing/control unit 230, a computer interface unit 270 for transmitting the compressed data stored in the image recording memory 260 to a computer (not shown), and an image filter 280 for converting the digital color image data from the image signal processing/control unit 230 to analog color image signals.

Here, the image signal processing/control unit 230 compresses the digital color image data stored in the strip memory 250, store the compressed data in the image recording memory 260, decompresses the compressed data stored in the image recording memory 260, and stores the decompressed data in the strip memory 250.

Further, the progressive image sensor 210 is a CCD (charge coupled device) or a CMOS (complementary metal oxide semiconductor) sensor.

Now, referring to FIG. 2, the digital still camera in accordance with a first embodiment of the present invention will be explained.

The lens unit 200 forms an image of a subject and directs the image toward the progressive image sensor/driving unit 210. The mechanical shutter of unit 200 controls the exposure time.

The progressive image sensor 210 of the present invention does not generate analog image signals in the interlacing mode which alternately generates the analog image signals field-by-field, but instead simultaneously generates analog image signals of the entire image. Accordingly, the progressive image sensor 210 captures a particular image formed and transmitted by the lens unit 200 only while the mechanical shutter 200 is open and simultaneously generates corresponding analog image signals of the entire image.

The image signal processing/control unit 230 causes the analog image signals from the progressive image sensor 210 to be applied to the analog/digital converter 220. The analog/digital converter 220 converts the analog image signals to digital image signals and inputs the digital image signals to the image signal processing/control unit 230. The image signal processing/control unit 230 generates digital color image data from the digital image signals and stores the digital color image data in the strip memory 250.

At this time, because the mechanical shutter unit 200 has been closed, image light is not transmitted through the lens unit 200. Accordingly, the progressive image sensor captures no additional images.

The image signal processing/control unit 230 stores the digital image data stored in the strip memory 250 in the image recording memory 260.

The image signal processing/control unit 230 compresses the digital color image data stored in the strip memory 250 and then stores the compressed data in the image recording memory 260.

The storage of image data from the strip memory 250 to image recording memory 260 by the image signal processing/control unit 230 is synchronized with the generation of the analog image signals by the progressive image sensor 210 such that the storage of image data takes place during periods when the mechanical shutter of lens unit 200 is closed, thereby preventing the generation of analog image signals.

The data stored in the image recording memory 260 is transmitted to the computer through the computer interface unit 270 by means of the control of the image signal processing/control unit 230.

The lens driving/controlling unit 240, by means of the lens and mechanical shutter unit 200, controls zooming and focusing operations, by controlling the iris, a focus, the mechanical shutter, and the progressive image sensor in synchronization with the compression of a still image.

The image signal processing/control unit 230 stores the image data stored in the image recording memory 260 in the strip memory 250 converts this image data to digital color image data. The digital color image data is applied to the image filter 280, which generates analog color image data from the digital color image data. Finally, the image filter 280 generates color image signals by filtering the digital color image data.

Further, the image signal processing/control unit 230 decompresses the compressed data of image recording memory 260 and inputs the decompressed data to the strip memory 250. In this case, the image signal processing/control unit 230 converts the decompressed data in the strip memory 250 to digital color image data. The digital color image data is applied to the image filter 280, which generates analog color image data from the digital color image data. Finally, the image filter 280 generates color image signals by filtering the digital color image data.

Figure 3:
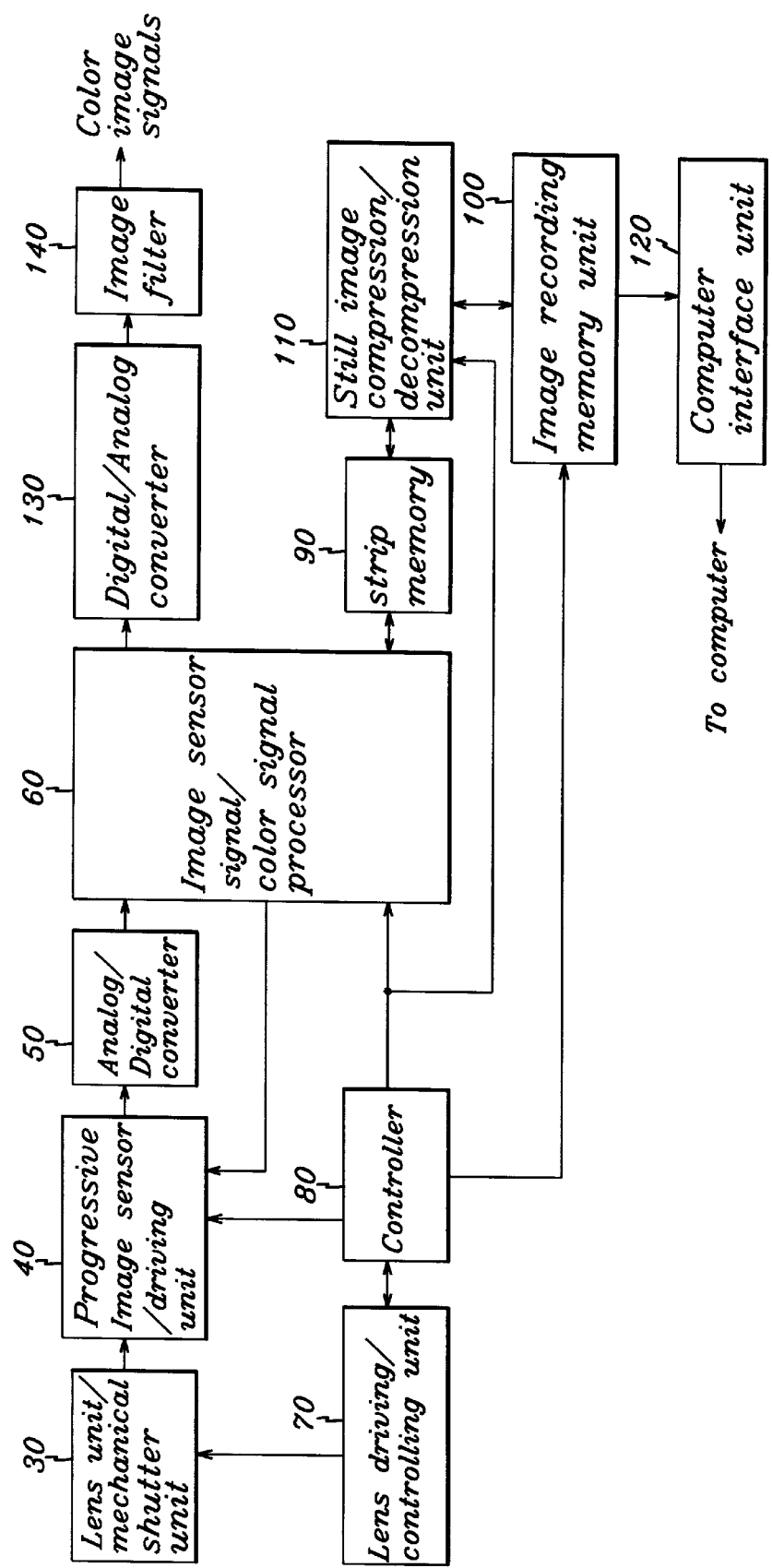
FIG. 3 is a block diagram of a digital still camera using a progressive image sensor in accordance with the second embodiment of the present invention.

FIG. 3 is a block diagram of a digital still camera using a progressive image sensor in accordance with a second embodiment of the present invention.

As shown in FIG. 3, the digital still camera comprises a lens unit/mechanical shutter unit 30 to form an image, a progressive image sensor/driving unit 40 to capture the image formed by the lens unit/mechanical shutter unit 30 and convert the light signals of the entire image into electric signals, an analog/digital converter 50 for converting the analog image signals from the progressive image sensor/driving unit 40 to digital image signals, and an image sensor signal/color signal processor 60 for generating digital color image data from the digital image signals. The camera further comprises a lens driving/controlling unit 70 to control the lens unit/mechanical shutter unit 30, a strip memory 90 to store the digital color image data line by line from the image sensor signal/color signal processor 60, and a still image compression/decompression unit 110 to compress the digital color image data stored in the strip memory 90 when storing the compressed data into an image recording memory 100, and to decompress the compressed data stored in image recording memory 100 when forwarding the data to the strip memory 90. The camera further comprises a controller 80 for controlling the progressive image sensor/driving unit 40, the image sensor signal/color signal processor 60, the lens driving/controlling unit 70, and the still image compression/decompression unit 110. Also, the camera comprises a computer interface unit 120 for transmitting the compressed data stored in the image recording memory 100 to a computer (not shown), a digital/analog converter 130 for converting the digital color image data from the image sensor signal/color signal processor 60 to analog color image data, and an image filter 140 for generating analog color image signals.

Now, referring to FIG. 3, the digital still camera in accordance with a second embodiment of the present invention will be explained.

The lens unit 30 forms an image of a subject and directs the image toward the progressive image sensor/driving unit 40. The mechanical shutter of unit 30 controls the exposure time.

The progressive image sensor 40 of the present invention does not generate analog image signals in the interlacing mode which alternately generates the analog image signals field-by-field, but instead simultaneously generates analog image signals of the entire image. Accordingly, the progressive image sensor 40 captures a particular image formed and transmitted by the lens unit 30 only while the mechanical shutter 30 is open and simultaneously generates corresponding analog image signals of the entire image.

The controller 80 causes the analog image signals from the progressive image sensor 40 to be applied to the analog/digital converter 50. The analog/digital converter 50 converts the analog image signals to digital image signals and inputs the digital image signals to the image sensor signal/color signal processor 60. The image sensor signal/color signal processor 60 generates digital color image data from the digital image signals and stores the digital color image data in the strip memory 90.

At this time, because the mechanical shutter unit 30 has been closed, image light is not transmitted through the lens unit 30. Accordingly, the progressive image sensor captures no additional images.

The still image compression/decompression unit 110 compresses the digital color image data stored in the strip memory and then stores the compressed data in the image recording memory 100.

The compression of the digital color image data by the still image compression/decompression unit 110 is synchronized with the generation of the analog image signals by the progressive image sensor 40 such that compression of image data takes place during periods when the mechanical shutter of lens unit 30 is closed, thereby preventing the generation of analog image signals.

The data stored in the image recording memory 100 is transmitted to the computer through the computer interface unit 120.

The lens driving/controlling unit 70, by means of the lens and mechanical shutter unit 30, controls zooming and focusing operations, by controlling the iris, a focus, the mechanical shutter, and the progressive image sensor in synchronization with the compression of still image.

The controller 80 controls the progressive image sensor/driving unit 40, the lens driving/controlling unit 70, the image sensor signal/color signal processor 60, and the still image compression/decompression unit 110.

The still image compression/decompression unit 110 decompresses the compressed data of image recording memory 100 and inputs the decompressed data to the strip memory 90. The image sensor signal/color signal processor 60 converts the decompressed data of the strip memory 90 to digital color image data. The digital color image data is applied to the digital/analog converter 130, which generates analog color image data from the digital color image data. Finally, the image filter 140 generates color image signals by filtering the digital color image data.

As described above, since the digital still camera in accordance with the present invention uses a progressive image sensor that can simultaneously generate analog image signals of the entire image, there is no necessity to use frame memories for storing images, which substantially reduces the cost of the digital still camera.

Other embodiments of the invention will be apparent to those skilled in the art from consideration of the specification and practice of the invention disclosed herein. It is intended that the specification and examples be considered as exemplary only, with the true scope and spirit of the invention being defined by the following claims.

What is claimed is:

1. A digital still camera, comprising:

a progressive image sensor for capturing an image and for generating signals corresponding to the entire image simultaneously;

a processor for generating image data corresponding to the image signals received from said progressive image sensor;

a first image memory for storing said image data directly received from said processor line-by-line without going through a frame memory; and a second image memory for storing said image data from said processor, wherein said processor compresses the image data stored in said first image memory, stores the compressed data in said second image memory, decompresses the compressed data stored in said second image memory, and stores the decompressed data in said first image memory without going through the frame memory.

2. The digital still camera of claim 1, wherein the storing of image data from said first image memory to said second image memory by processor is synchronized with the generation of signals by said progressive image sensor.

3. The digital still camera of claim 2, further comprising:

a lens unit for receiving image light from a subject and directing said image light to said progressive image sensor; and a shutter unit for shielding said lens unit from the image light.

4. The digital still camera of claim 3, wherein said shutter unit is closed while said processor compresses image data.

5. The digital still camera of claim 1, further comprising an image filter for converting said image data to analog color image signals.

6. The digital still camera of claim 1, further comprising a computer interface means for transmitting the image data to a computer.

7. The digital still camera of claim 1, wherein said progressive image sensor is a charge coupled device.

8. The digital still camera of claim 1, wherein said progressive image sensor is a complementary metal oxide semiconductor sensor.

9. A digital still camera, comprising:

a progressive image sensor for capturing an image and for simultaneously generating signals corresponding to the entire image;

a processor for generating image data corresponding to the image signals received from said progressive image sensor;

a first image memory for storing said image data directly received from said processor line-by-line without going through a frame memory;

a compression/decompression unit for compressing said data stored in said memory and decompressing the compressed data without going through the frame memory;

a second image memory for storing the compressed data from said compression/decompression unit; and a controller for controlling said progressive image sensor, said processor, and said compression/decompression unit.

10. The digital still camera of claim 9, wherein the compression of data by said compression/decompression unit is synchronized with the generation of signals by said progressive image sensor.

11. The digital still camera of claim 10, further comprising a lens unit for receiving image light from a subject and directing said image light to said progressive image sensor, and a shutter unit for shielding said lens unit from the image light.

12. The digital still camera of claim 11, wherein said shutter unit is closed while said compression/decompression unit compresses image data.

13. The digital still camera of claim 9, further comprising an image filter for converting the image data to analog color image signals.

14. The digital still camera of claim 9, further comprising a computer interface means for transmitting the compressed data to a computer.

15. The digital still camera of claim 9, wherein said progressive image sensor is a charge coupled device.

16. The digital still camera of claim 9, wherein said progressive image sensor is a complementary metal oxide semiconductor sensor.

* * * * *